United States Patent
Nadler et al.

(10) Patent No.: US 8,472,972 B2
(45) Date of Patent: Jun. 25, 2013

(54) DEVICE, SYSTEM, AND METHOD OF PHYSICAL CONTEXT BASED WIRELESS COMMUNICATION

(75) Inventors: Sima Nadler, Kochav Yair (IL); Vladimir Soroka, Karmiel (IL)

(73) Assignee: International Business Machines Corporation, Armonk, NY (US)

( * ) Notice: Subject to any disclaimer, the term of this patent is extended or adjusted under 35 U.S.C. 154(b) by 1209 days.

(21) Appl. No.: 11/943,605

(22) Filed: Nov. 21, 2007

(65) Prior Publication Data
US 2009/0131080 A1 May 21, 2009

(51) Int. Cl.
*H04W 24/00* (2009.01)
*H04M 3/42* (2006.01)

(52) U.S. Cl.
USPC .......... 455/456.1; 455/456.3; 455/456.5; 379/211.02

(58) Field of Classification Search
USPC ...................................... 455/456.1
See application file for complete search history.

(56) References Cited

U.S. PATENT DOCUMENTS

| | | | | |
|---|---|---|---|---|
| 5,471,616 A | * | 11/1995 | Johnson et al. | 726/34 |
| 7,071,842 B1 | | 7/2006 | Brady, Jr. | |
| 7,489,774 B2 | * | 2/2009 | Agrawal et al. | 379/211.02 |
| 2002/0049656 A1 | * | 4/2002 | Lancos et al. | 705/35 |
| 2004/0077359 A1 | | 4/2004 | Bernas | |
| 2010/0142692 A1 | * | 6/2010 | Gotta et al. | 379/201.02 |

FOREIGN PATENT DOCUMENTS

| | | |
|---|---|---|
| WO | WO03046709 | 6/2003 |
| WO | WO2005076772 | 8/2005 |
| WO | 2005/043940 | * 12/2005 |
| WO | WO2007016049 | 2/2007 |

OTHER PUBLICATIONS

J. Al-Muhtadi et al., "Context and location-aware encryption for pervasive computing environment", 2006 http://www.cl.com.ac.uk/~fms27/persec-2006/goodies/2006-AlmuhtadiHilCamETAL-ecryption.pdf.
R. Frieco et al., "Context-aware provision of advanced Internet services", PERCOMW'06, 2006.

* cited by examiner

*Primary Examiner* — Melody Mehrpour
*Assistant Examiner* — Natasha Cosme (57) ABSTRACT

Device, system and method of physical context based wireless communication. For example, a method for physical context based wireless communication includes: determining an association between a spatial location of a wireless communication device and location context information related to said spatial location; determining an identity of a user of said wireless communication device; and determining an association between said user of the wireless communication device and said location context information.

21 Claims, 2 Drawing Sheets

DEVICE, SYSTEM, AND METHOD OF PHYSICAL CONTEXT BASED WIRELESS COMMUNICATION

FIELD

Some embodiments of the invention are related to the field of communication using cellular phones and other wireless communication devices.

BACKGROUND

A wireless communication device, for example, a cellular phone, allows a user to wirelessly communicate with other persons, for example, by conducting an audio conversation, by sending and receiving Short Message Service (SMS) messages, by sending and receiving Multimedia Messaging Service (MMS) messages, or the like.

A wireless communication system may roughly locate a general area in which the wireless communication device is located. This may be performed, for example, by determining a wireless cell to which the wireless communication device is associated. For example, the wireless communication system may determine that the wireless communication device is located in a cell which is in proximity to a mall, and may transmit to the wireless communication device an advertisement for goods or services provided in that mall. Unfortunately, such localization methods may not be sufficiently accurate or efficient.

SUMMARY

Some embodiments of the invention include, for example, devices, systems and methods of physical context based wireless communication.

In some embodiments, a method for physical context based wireless communication includes: determining an association between a spatial location of a wireless communication device and location context information related to the spatial location; determining an identity of a user of the wireless communication device; and determining an association between the user of the wireless communication device and the location context information.

In some embodiments, determining an association between the spatial location and the location context information includes: measuring a presence zone perimeter associated with the spatial location; and registering the association between the spatial location and the location context information based on the presence zone perimeter.

In some embodiments, determining an association between the spatial location and the location context information includes: dynamically inferring the association between the spatial location and the location context information based on Presence Advanced Services for Telco Applications logic.

In some embodiments, the method includes: determining whether or not the wireless communication device is located in the spatial location by one or more operations selected from the group consisting of: determining based on cellular triangulation of the wireless communication device; determining based on Global Positioning System trilateration of the wireless communication device; determining based on sensing a Radio Frequency ID element of the wireless communication device; determining based on sensing a Bluetooth wireless signal transmitted by the wireless communication device; determining based on sensing an IEEE 802.11 wireless signal transmitted by the wireless communication device; and determining based on sensing an IEEE 802.16 wireless signal transmitted by the wireless communication device.

In some embodiments, determining the identity of the user of the wireless communication device includes one or more operations selected from the group consisting of: one or more operations for determining the identity of the user based on ID data associated with the wireless communication device and based on a database of cellular phone users; and one or more operations for determining the identity based on ID data associated with the wireless communication device and a database having pre-registered information entered by the user of the wireless communication device.

In some embodiments, the method includes: determining whether or not a first wireless communication device is located in the spatial location; determining an identity of a user of the first wireless communication device; determining whether or not a second wireless communication device is located in the spatial location; determining an identity of a user of the second wireless communication device; and associating between the location context information, the user of the first wireless communication device, and the user of the second wireless communication device.

In some embodiments, the method includes: registering a presence zone associated with the spatial location; automatically determining whether or not the wireless communication device is within the presence zone; and publishing to a presence server an indication selected from the group consisting of: an indication that the wireless communication device is within the presence zone; and an indication that the wireless communication device is not within the presence zone.

In some embodiments, the method includes: determining whether or not the wireless communication device moved from a first presence zone associated with a first spatial location to a second presence zone associated with a second spatial location; and activating one or more pre-defined call routing rules associated with the second presence zone.

In some embodiments, the method includes: selectively providing a content item to the wireless communication device based on the identity of the user of the wireless communication device, the spatial location of the wireless communication device, and the location context information related to the wireless communication device, wherein the content item is selected from the group consisting of: an advertisement, a coupon, a promotional offer, a dating application, a dating content item, a gaming application, and a gaming content item.

In some embodiments, the method includes: routing an incoming call addressed to the wireless communication device to an alternate destination, based on the identity of the user of the wireless communication device, the location of the wireless communication device, and the location context information related to the wireless communication device.

In some embodiments, the alternate destination includes one or more of: a voice messaging system, an electronic mail system, an Instant Messaging system, a Short Messaging Service system, an alternate telephone number, and a pager.

In some embodiments, a system for physical context based wireless communication includes: a server to determine an association between a spatial location of a wireless communication device and location context information related to the spatial location, to determine an identity of a user of the wireless communication device, and to determine an association between the user of the wireless communication device and the location context information.

In some embodiments, a wireless communication device adapted for physical context based wireless communication includes: a wireless receiver to receive a wireless communication signal carrying a content item selected by a remote transmitter based on a determined association between a spatial location of the wireless communication device and location context information related to the spatial location, based on a determined identity of a user of the wireless communication device, and based on a determined association between the user of the wireless communication device and the location context information; and a processor to perform at least part of a logic which determines the association between the spatial location and the location context information, determines the identity of the user, and determines the association between the user and the location context information.

In some embodiments, a system for presence zone based wireless communication includes: a database to associate between a presence zone and location context information related to the presence zone; a presence detector to detect whether or not a user of a wireless communication device is located within the presence zone; a presence server to publish to one or more subscribers data indicating whether or not the user of the wireless communication device is located within the presence zone; and an application server to selectively transmit content to the wireless communication device based on the presence zone, the location context information, and an identity of the user of the wireless communication device.

Some embodiments may include, for example, a computer program product including a computer-useable medium including a computer-readable program, wherein the computer-readable program when executed on a computer causes the computer to perform methods in accordance with some embodiments of the invention.

Some embodiments of the invention may provide other and/or additional benefits and/or advantages.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

In the following detailed description, numerous specific details are set forth in order to provide a thorough understanding of some embodiments of the invention. However, it will be understood by persons of ordinary skill in the art that embodiments of the invention may be practiced without these specific details. In other instances, well-known methods, procedures, components, units and/or circuits have not been described in detail so as not to obscure the discussion.

Discussions herein utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality" as used herein includes, for example, "multiple" or "two or more". For example, "a plurality of items" includes two or more items.

Although portions of the discussion herein relate, for demonstrative purposes, to wired links and/or wired communications, embodiments of the invention are not limited in this regard, and may include one or more wired or wireless links, may utilize one or more components of wireless communication, may utilize one or more methods or protocols of wireless communication, or the like. Some embodiments of the invention may utilize wired communication and/or wireless communication.

Some embodiments of the invention may be used in conjunction with various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a non-mobile or non-portable device, a wireless communication station, a wireless communication device, a wireless Access Point (AP), a wireless Base Station, a Mobile Subscriber Station (MSS), a wired or wireless Network Interface Card (NIC), a wired or wireless router, a wired or wireless modem, a wired or wireless network, a Local Area Network (LAN), a Wireless LAN (WLAN), a Metropolitan Area Network (MAN), a Wireless MAN (WMAN), a Wide Area Network (WAN), a Wireless WAN (WWAN), a Personal Area Network (PAN), a Wireless PAN (WPAN), devices and/or networks operating in accordance with existing IEEE 802.11, 802.11a, 802.11b, 802.11g, 802.11n, 802.16, 802.16d, 802.16e, 802.16m standards and/or future versions and/or derivatives and/or Long Term Evolution (LTE) of the above standards, units and/or devices which are part of the above networks, one way and/or two-way radio communication systems, cellular radio-telephone communication systems, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates a Radio Frequency Identification (RFID) element or tag or transponder, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, a wired or wireless handheld device (e.g., BlackBerry, Palm Treo), a Wireless Application Protocol (WAP) device, or the like.

Some embodiments of the invention may be used in conjunction with one or more types of wireless communication signals and/or systems, for example, Radio Frequency (RF), Infra Red (IR), Frequency-Division Multiplexing (FDM), Orthogonal FDM (OFDM), OFDM Access (OFDMA), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, Multi-Carrier Modulation (MDM), Discrete Multi-Tone (DMT), Bluetooth®, Global Positioning System (GPS), Wi-Fi, Wi-Max, ZigBee™, Ultra- Wideband (UWB), Global System for Mobile communication (GSM), 2G, 2.5G, 3G, Third Generation Partnership Project (3GPP), 3.5G, or the like. Embodiments of the invention may be used in various other devices, systems and/or networks.

The term "mobile device" as used herein includes, for example, a cellular phone, a mobile phone, a laptop computer, a notebook computer, a wireless communication device, a wireless communication station, a tablet computer, a PDA device, a handheld device, a portable computer, a portable computing device, a mobile computer, a mobile computing device, or the like.

The term "mobile device user" as used herein includes, for example, a user of a mobile device, an owner of a mobile device, a registered user or owner of a mobile device, a subscriber to mobile services or wireless services or cellular services, a person or entity associated (e.g., for registration purposes, for billing purposes, or the like) with a mobile device, or the like.

In some embodiments, substantially all the logic, algorithms, determinations and/or processing described herein may be server-side and may be included in, or performed by, one or more servers. In other embodiments, substantially all the logic, algorithms, determinations and/or processing described herein may be client-side and may be included in, or performed by, one or more clients or mobile devices. In yet other embodiments, at least a first portion of the logic, algorithms, determinations and/or processing described herein may be server-side and may be included in, or performed by, one or more servers; whereas at least a second portion of the logic, algorithms, determinations and/or processing described herein may be client-side and may be included in, or performed by, one or more clients or mobile devices. Other suitable architectures may be used.

At an overview, some embodiments of the invention provide devices, systems and method of physical context based wireless communication. A mobile device is used in order to identify its user's context, namely, the physical context associated with the user of the mobile device. In some embodiments, the physical location of the mobile device and its user may be identified using one or more location identification methods, for example, cellular triangulation, GPS, Bluetooth communication, RF Identification (RFID) tagging, or the like. The identified location is associated with physical context information, thereby allowing to provide to the mobile device tailored applications and tailored content, to specifically accommodate the location of the mobile device, the physical context of the user of the mobile device, and/or personal properties of the user of the mobile device.

Some embodiments thus provide methods to identify or to determine a physical context of a user of a mobile device. The physical context is determined based on multiple components, for example: the identity (or other personal information) of the user of the mobile device; the determined physical location of the user of the mobile device; and the context associated with the determined physical location. Some embodiments allow determination of these multiple components, thereby allowing determination of the context of the user of the mobile device. The determined context may be used in various types of applications, for example, call routing, advertising, dating, gaming, or the like. The derived context allows personalized data and applications to be provided to end-users of mobile devices.

Some embodiments utilize presence zones, in order to identify the context of the user of a mobile device. The combination of the identity (or other properties) of the user of the mobile device, the location of the user, and the context of the location, is used in order to provide tailored applications and/or tailored content to the user of the mobile device. In some embodiments, this is performed using a service provider which provides context-based applications and/or content to one or more physical location owners.

In some embodiments, presence zones core functionality defines multiple roles, for example, a mobile device user, a location or zone, a zone owner, and a service provider.

The mobile device user is the user who carries the device with him as he moves from location to location. The user may define preferences associated with presence ones service(s).

The location/zone is a specific physical location for which there is an interest in identifying the people in the location/zone. This may be a home, office, school, restaurant, store, specific sub-area of a location (e.g., a hospital emergency room), or the like. It may further include a dynamic zone which exists based on the presence of certain people or other parameters. For example, a person's office may be considered a meeting room if several people are present for more than a couple of minutes.

The zone owner is a person or entity who owns or holds responsibility for the zone. The zone owner provides information about the zone to the presence zones service provider, for example, the name of the business or location, type of business/organization, pertinent parameters for the presence zones service (e.g., hours during which to enforce a quiet zone, database containing coupons and advertising parameters, etc).

The service provider is the enterprise or communications service provider that provides the presence zones service(s). The identity of the mobile device user is registered with the service provider.

In some embodiments, zone registration and initialization is performed; for example, once a zone of interest is identified, the zone is registered with the service provider and the location identification method is set. Different methods may include different types of registration and initialization. Some methods may utilize sensors installed on the premises, whereas other methods may require that the exact physical coordinates be measured and registered with the service provider. Other zone installation requirements and/or zone mapping requirements may be used.

For example, some embodiments that utilize cellular triangulation, do not require installation of sensors in the zone; and require identification of cellular base stations in the vicinity of the zone. Some embodiments that utilize Bluetooth communication require installation of one or more Bluetooth sensors in the zone, and do not require zone mapping. Some embodiments that utilize GPS communication do not require installation of sensors in the zone; and require measurement and registration of zone perimeter coordinates. Some embodiments that utilize a passive RFID element require installation of one or more RFID sensors in the zone; and do not require zone mapping.

In some embodiments, the zone owner provides additional service-specific parameters. The presence zones service provider may provide a Web-based interface to input the information required during the zone registration process.

If Bluetooth, or other on-site sensor technology, is utilized as the location technology, then one or more sensors are installed in the zone, and a means of communicating the information collected by the sensors is established. Data transfer may be performed using PSTN, cellular or other communication methods. Each sensor includes presence zones software, which scans for mobile devices in the vicinity, notes their Bluetooth ID or RFID or other identifying data, and sends the IDs together with the zone ID to the service provider to note their presence in the sensor vicinity. The sensor further logs which mobile devices are in its vicinity, and logs when a mobile device leaves the zone; this information is further sent to the service provider. In some embodiments utilizing Bluetooth, pairing is not required, and a Bluetooth inquiry is used. In some embodiments, SIP protocol and a SIP stack are used to send the IDs from sensor to the service provider.

In some embodiments, the sensor and/or the software may be implemented using a PDA device, a cellular phone, a J2ME device, a laptop computer using a J2SE platform, a dedicated appliance (e.g., supplied by the service provider).

Some embodiments may utilize server-side location technologies. For example, when using GPS or cellular triangulation to identify the mobile device location, there is no need to install sensors in the zone premises; instead, the system pre-registers the physical coordinates of the zone with the service provider. For example, when GPS is used, a user walks through the premises and notes coordinates that define the location. Optionally, a J2ME application is provided to assist in this process such that a GPS-enabled mobile device user walks from point to point, presses a button in the mobile application, and automatically has the coordinate registered for the specified zone. A similar process may be performed with regard to cellular-based localization.

Some embodiments include an interface for the mobile device users to indicate their individual preferences regarding the presence zones service(s). This may include a means to register the Bluetooth or RFID number of the mobile device, in order to allow service to identify the registered mobile device. This interface may be hosted by the presence zones service provider, and may be Web based.

In some embodiments, once the zone is registered, sensors installed if necessary, and users are registered for a presence zones service, the system goes into operational mode. The location sensing subsystem receives input from the various types of sensors installed on the premises, and/or the GPS or cellular triangulation data received from internal systems. The system aggregates the information and identifies mobile device users who entered, left, and/or remain in the zone. The system identifies the mobile device ID and the zone ID, and then uses a proxy to obtain the user's identity based on the mobile device ID. The system then sends this information to components that act on this information, for example, a presence server and/or a presence zone application server which hosts the logic for the presence zones service. Optionally, an arbitration component is utilized to handle situations where a mobile device user is identified as located in more than one zone.

In some embodiments, the proxy receives raw location information; converts sensor ID (for example, RFID, Bluetooth, GPS, or the like) into SIP URIs; and sends the information to the application server. As a proxy, this application is used for all of the initial SIP messages, as a gateway. For example, "INVITE" messages are forwarded to the presence zones application server, to be handled; whereas "SUBSCRIBE" messages are sent to the presence server. The proxy may further operate as a registrar and receives "REGISTER" messages; data regarding the registered entities (or presentities) is saved in memory.

Once a request is made to invoke the service-specific logic, the system already has the user's identity, location, and contextual location. One or more applications, services and/or content may be selectively provided to the mobile device user, based on the determined information.

Some embodiments utilize Presence Advanced Services for Telco Applications (PASTA) systems or applications, or a PASTA inference engine, for example, a PASTA logic server or sub-system. For example, the system logic may utilize PASTA to allow the physical context information to be used together with other information from other sources (for example, other persons in the vicinity, calendar, call detail records, activities being performed on a PC, or the like) in order to infer dynamic presence zones. PASTA logic may further be used to publish information that is a result of aggregating data from several different sources, and/or information learned from experience based on previous activities (e.g., a machine learning engine, event processing, or the like).

Some embodiments utilize presence logging or presence tracking, for example, storing and tracking the presence information that is determined. For example, a database is used to store and log the mobile device user's presence status changes, e.g., time of entry into the zone, time of exit from the zone, name and type of the zone, or the like. The data stored in database may be analyzed; and a reporting engine generates reports about individual subscribers (e.g., subject to subscriber approval), groups of subscribers (e.g., which belong to an enterprises), and/or general trend analysis.

Figure 1:
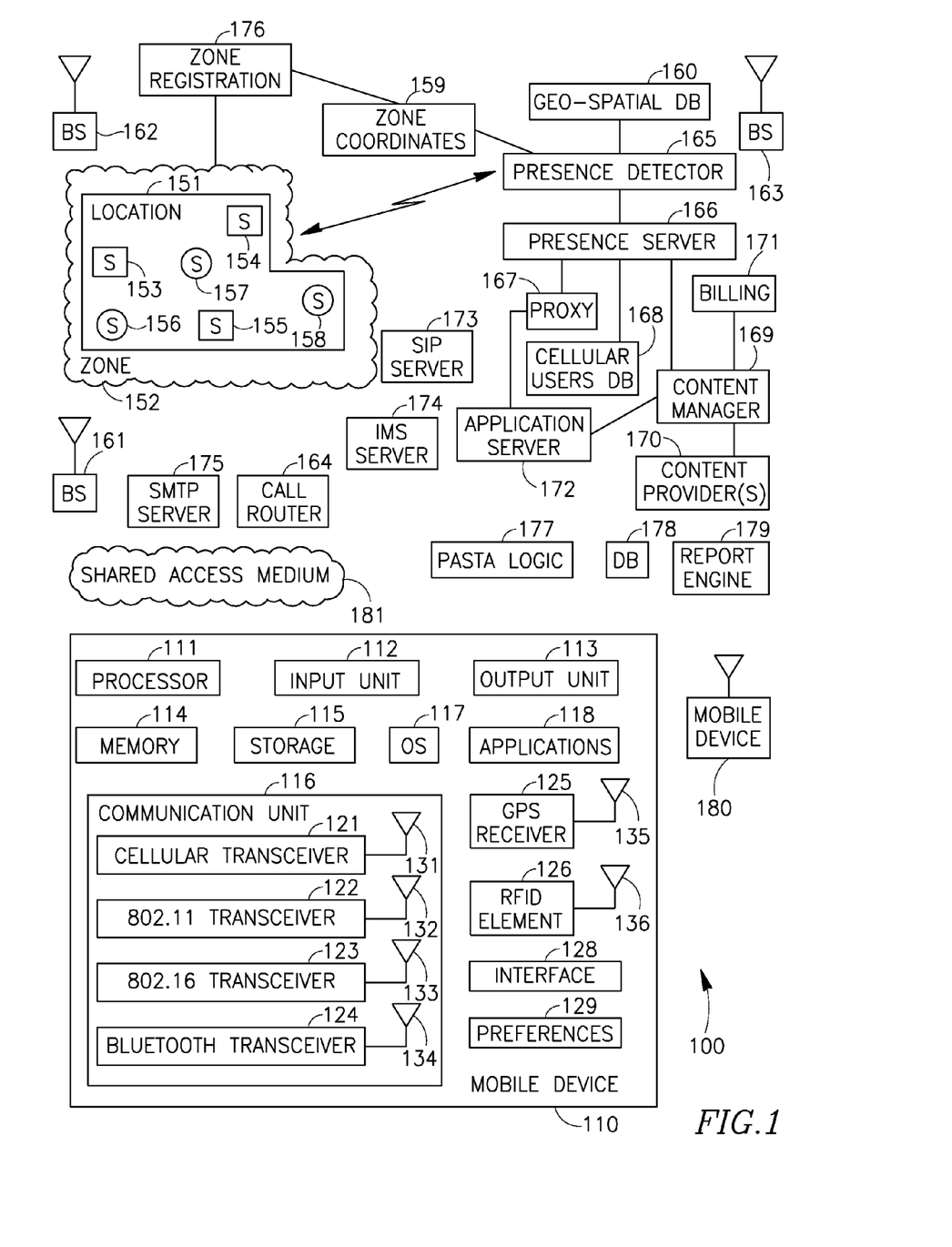
FIG. 1 is a schematic block diagram illustration of a wireless communication system in accordance with a demonstrative embodiment of the invention.

FIG. 1 schematically illustrates a block diagram of a wireless communication system 100 in accordance with some demonstrative embodiments of the invention. System 100 includes one or more mobile devices, for example, mobile devices 110 and 180; and one or more presence zones, for example, a presence zone 152. System 100 optionally includes other suitable components, for example, one or more wireless Access Points (APs) or Base Stations (BSs). Optionally, mobile devices 110 and 180, as well as other components of system 100, communicate using wireless links (e.g., uplinks and downlinks) through a shared access medium 181.

Mobile device 110 includes, for example, a processor 111, an input unit 112, an output unit 113, a memory unit 114, a storage unit 115, and a communication unit 116. Mobile device 110 optionally includes other suitable hardware components and/or software components.

Processor 111 includes, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or other suitable multi-purpose or specific processor or controller. Processor 111 executes instructions, for example, of an Operating System (OS) 117 or of one or more applications 118.

Input unit 112 includes, for example, a keyboard, a keypad, a mouse, a touch-pad, a joystick, a track-ball, a stylus, a microphone, or other suitable pointing unit or input device. Output unit 113 includes, for example, a monitor, a screen, a Cathode Ray Tube (CRT) display unit, a Liquid Crystal Display (LCD) display unit, a plasma display unit, one or more audio speakers or earphones, or other suitable output devices.

Memory unit 114 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 115 includes, for example, a hard disk drive, a floppy disk drive, a Compact Disk (CD) drive, a CD-ROM drive, a Digital Versatile Disk (DVD) drive, or other suitable removable or non-removable storage units. Memory unit 114 and/or storage unit 115, for example, store data processed by mobile device 110.

Communication unit 116 includes, for example, a wireless transceiver, a wireless modem, a wireless Network Interface Card (NIC), or the like. Communication unit 116 includes, for example, a radio transceiver 121 for cellular network, an IEEE 802.11 transceiver 122, an IEEE 802.16 transceiver 123, and/or a Bluetooth transceiver 124. Each one of transceivers 121-124 includes, for example, a wireless Radio Frequency (RF) transmitter-receiver able to transmit and/or receiver wireless RF signals, blocks, frames, transmission streams, packets, messages and/or data.

Transceivers 121-124 may be associated with one or more antennas, for example, with antennas 131-134, respectively. Antennas 131-134 may be implemented using a common antenna, a common set of multiple antennas, or other suitable component(s). In some embodiments, antennas 131-134 may include an internal and/or external RF antenna, a dipole antenna, a monopole antenna, an omni-directional antenna, an end fed antenna, a circularly polarized antenna, a microstrip antenna, a diversity antenna, or other type of antenna suitable for transmitting and/or receiving wireless communication signals, blocks, frames, transmission streams, packets, messages and/or data.

Optionally, mobile device 110 may further include a GPS receiver 125, which may be associated with an antenna 135. The GPS position of mobile device 110 is tracked using a GPS server, which provides the coordinates of mobile device 110 to the presence zones service provider. Optionally, mobile device 110 may further include a RFID element 126, for example a RFID tag, a RFID transponder, a RFID chip, a chipless RFID object, a RFID IC, a passive RFID tag, an active RFID tag, a semi-passive or battery-assisted RFID tag, or the like. The RFID element 126 may be associated with an antenna 136.

In some embodiments, some or all of the components of mobile device 110 may be enclosed in a common housing or packaging, and may be interconnected or operably associated using one or more wired or wireless links. In other embodiments, components of mobile device 110 may be distributed among multiple or separate devices or locations.

In some embodiments, system 100 may perform operations taking into account multiple components. System 100 may utilize information about the identity of the user and/or owner of the mobile device 110, who carries and/or operates the mobile device 110, optionally while roaming or moving among locations, and who is able to define preferences associated with presence zones services. System 100 may further utilize information about one or more locations of interest, for example, a specific physical location 151 for which there is an interest in identifying persons (namely, mobile device users) located therein. Location 151 may be, for example, an office, a school, a restaurant, a store, a hospital, a home, a specific sub-area of a location (e.g., an emergency room of a hospital), or the like. One or more presence zones may be defined to generally correspond to locations, or to generally cover the area of locations, respectively; for example, a presence zone 152 may be set and/or defined to generally correspond to the area and position of location 151.

In some embodiments, a presence zone may be dynamic and may be modified or re-defined based on situational information. For example, if a mobile device user is located within her office, then a context of "office" is determined; subsequently, it is determined that several other persons joined her, and a "meeting" context or a "meeting" zone may be automatically defined. Other automatic modifications may be performed with regard to zones and/or contexts.

A location 151, and a corresponding presence zone 152, may be associated with a zone owner or a location owner, namely, an entity which owns or manages or is responsible for that location 151 or for that presence zone 152. The zone owner provides information about the zone 152 to a presence zone service provider, for example, information including the name of the business or location, the type of the business or organization, and parameters relevant for the presence zones service (e.g., hours during which to enforce a quiet zone; database including coupons, promotions and advertising parameters; or the like). A presence zone service provider is an entity which provides presence zones service(s) to one or more zone owners.

Mobile device 110 and/or system 100 may be adapted or configured to support physical context based wireless communication. In some embodiments, the sensing technology installed in the location 151 may determine the capabilities required from the mobile device 110. In other embodiments, the components included in mobile device 110 may determine the capability of the location 151 to provide presence zone services to mobile device 110 while the mobile device 110 is in the presence zone 152 associated with location 151.

In some embodiments, for example, presence zone services may be selectively provided to mobile device 110 while the mobile device is in presence zone 152, based on cellular triangulation. For example, multiple cellular base stations 161-163, located in the vicinity of the presence zone 152, utilize triangulation to identify the location of the mobile device 110 which includes the cellular transceiver 121.

Additionally or alternatively, the determination that mobile device 110 is located within presence zone 152 may be performed using GPS trilateration, for example, utilizing the GPS receiver 125 of mobile device 110 and three or more GPS satellites. Coordinates of the perimeter of presence zone 152 may be measured and registered in advance (e.g., by the presence zone service provider, or by the zone owner utilizing a zone registration interface 176 provided by the presence zone service provider), as zone perimeter coordinates 159, to allow association between the geo-spatial location of the mobile device 110 and the presence zone 152. Optionally, a geo-spatial information database 159 may be utilized or queried for performing the association.

Additionally or alternatively, the determination that mobile device 110 is located within presence zone 152 may be performed using Bluetooth communication. For example, location 151 may include one or more Bluetooth transceivers or Bluetooth sensors 153-155 (e.g., installed in the presence zone 152 by a presence zone service provider). The Bluetooth sensors 153-155 may determine that mobile device 110, which includes a Bluetooth transceiver 124, is located within the presence zone 152. In some embodiments, the relatively short range of Bluetooth communication (e.g., under 100 meters) may allow precise localization of the mobile device 110 and/or improved level of resolution (e.g., determination that mobile device 110 is located in a specific store, and not generally inside or near the mall; or determination that mobile device 110 is located in a specific hospital department, and not generally inside or near the hospital). Other short-range communication standards or protocol may be used to determine whether or not the mobile device 110 is located within presence zone 152.

Additionally or alternatively, the determination that mobile device 110 is located within presence zone 152 may be performed using RFID tagging. For example, location 151 may include one or more RFID sensors 156-158 (e.g., installed in the presence zone 152 by a presence zone service provider). The RFID sensors 156-158 may determine that mobile device 110, which includes the RFID element 126, is located within the presence zone 152. In some embodiments, the relatively short range of RFID tagging (e.g., under 100 meters) may allow precise localization of the mobile device 110 and/or improved level of resolution (e.g., determination that mobile device 110 is located in a specific store, and not generally inside or near the mall; or determination that mobile device 110 is located in a specific hospital department, and not generally inside or near the hospital).

The determination that mobile device 110 is located within presence zone 152 may be performed using one or more methods, for example, by a presence detector 165. Upon detection, the presence detector 165 may indicate to a presence server 166 (e.g., directly, or using a proxy 167 or other routing mechanism) that mobile device 110 is located within presence zone 152. Presence detector 165 takes into account information from one or more sensors and/or types of location sensors, in order to determine in which presence zone the mobile device 110 is located. Presence detector 165 may determine that the mobile device 110 is in a zone, enters a zone, leaves a zone, or the like. In some embodiments, if the presence detector 165 identifies the mobile device 110 in more than one presence zone, an arbitration mechanism is used in order to make the final determination regarding the presence zone in which the mobile device 110 is located; the arbitration mechanism may be configured to accommodate the needs of a specific presence zones application.

Presence detector 165 and/or presence server 166 may select or generate applications, services or content to be selectively provided to mobile device 110 (e.g., and not to other mobile devices in its vicinity). The selection or generation is performed based on the determination that mobile device 110 is in presence zone 152; based on the identity of the user or owner of mobile device 110 (e.g., as obtained from a cellular users database 168 of a cellular communication provider, or from the presence zones service provider's database); based on the information that presence zone 152 has one or more pre-defined properties (e.g., a property of a restaurant); and optionally based on other properties of the user of mobile device 110 (e.g., gender, age, shopping history, or the like), optionally obtained from the cellular users database 168 or from an external database provided by a business partner. The presence detector 165 may thus tailor specific applications, services or content to be provided to mobile device 110.

In some embodiments, the tailored content may be generated or modified using a content manager module 169, optionally utilizing input received from content provider(s) 170. For example, content providers 170 provide access to multiple advertisements, and content manager module 169 selects an advertisement based on determination that mobile device 110 is located within presence zone 152, based on determination that presence zone 152 corresponds to location 151 which is a restaurant, and based on determination that the user of mobile device 110 is Jane Adams, a 24 year-old female. Optionally, a billing server 171 is utilized to charge the user of mobile device 110 for provided services, and/or to obtain information about prior transactions performed by the user of mobile device 110 (e.g., shopping history).

Presence server may utilize an application server 172 to select, generate and/or provide applications to the mobile device 110. The application server 172 may be associated, for example, with a Session Initiation Protocol (SIP) server 173 or other SIP components; IP Multimedia Subsystem (IMS) server 174 or IMS applications or IMS components; and/or a Simple Mail Transfer Protocol (SMTP) server 175. In some embodiments, mobile device 110 located within the presence zone 152 may be provided with IMS applications, SIP applications, or other applications or content in accordance with other suitable protocols, optionally using gateways to allow interaction with legacy networks. In some embodiments, mobile device 110 need not be an IMS-enabled handset in order to receive tailored content and applications when located within the presence zone 152.

In some embodiments, a presence zone service provider may provide services of zone registration, initialization and/or operations. For example, once a presence zone of interest is identified, it is registered with the presence zone service provider and one or more location identification methods are determined and set. In some embodiments, different localization methods may require different types of registration and initialization. For example, some localization methods include installation of sensors on the premises of location 151; other localization methods include measuring of exact physical coordinates and their registration with the presence zone service provider. Optionally, the owner or operator of location 151 provides to the presence zone service provider additional service-specific parameters. In some embodiments, zone registration process may be performed using an Internet web-site or other Web interface.

In some embodiments, an on-site sensing mechanism may be used and/or installed in location 151, for example, Bluetooth sensors 153-155, RFID sensors 156-158, or the like. Information collected by the sensors is transferred to the presence detector 165, for example, using cellular communication, IEEE 802.11 communication, IEEE 802.16 communication, wired communication, wireless communication, or Public Switched Telephone Network (PSTN). A sensor may be associated with, or may include, a presence zone software or a presence zone application, which scans for mobile device (s) in the vicinity of the sensor, records the ID(s) of identified mobile device(s), and transfers the mobile device(s) ID(s) together with the presence zone 152 ID to the presence zone service provider (e.g., to presence server 166). In some embodiments, the sensor may keep track of a mobile device that is identified to be within the presence zone 152, may subsequently determine that the mobile device exited the presence zone 152, and may transfer this information to the presence zone service provider (e.g., to presence server 166).

Some embodiments may utilize server-side location technologies, for example, GPS or cellular triangulation, to identify the location of mobile device 110. In some embodiments, this may not required installation of components or software in the premises of location 151. Some embodiments may include registration of the physical coordinates of the presence zone 152 with the presence zone service provider. For example, if GPS is used, the registration includes walking through the premises of location 151 and noting coordinates that define the perimeters of the location 151. Optionally, a Java 2 Micro Edition (J2ME) application is utilized such that a GPS-enabled mobile device user may walk from point to point, optionally press a button in the application, and automatically have the coordinate registered for the specified presence zone. Similar methods may be used in conjunction with cellular triangulation.

In some embodiments, an interface 128 is provided to allow mobile device users to indicate their individual preferences 129 regarding presence zones services (optionally, preferences which may be specific to a particular presence zone application, zone type, or to a type of presence zone applications); as well as a means to allow a mobile device user to register his mobile device sensor identification number (e.g., using Bluetooth, RFID, etc.) such that the service will be able to identify the mobile device user. The interface 128 may be provided or hosted by the presence zones service provider, and may be Web based.

Once the presence zone 152 is registered, sensors are installed (if required), and mobile device users are registered for a presence zone service, the system 100 is fully operational. A location sensing subsystem (e.g., presence detector 165) receives input from the various types of sensors installed on the premises of location 151, and/or receives GPS data and/or cellular triangulation data received from other subsystems. The information is aggregated to identify people who enter, leave, and/or remain within the presence zone 152. Presence detector 165 and/or the presence server 166 has information of the ID of mobile device 110, and the zone ID of the presence zone 152, and utilizes the proxy 167 to obtain the user's identity based on the mobile device ID. The presence detector 165 and/or the presence server 166 and/or the application server 162 utilize this information to provide to mobile device 110 tailored content, services and/or applications.

Server-side logic may provide multiple functionalities, for example: correlation between mobile device ID and subscriber information, namely, identifying the owner of the mobile device 110 based on the mobile device ID received from the mobile device 110; aggregation of sensor info, such that information is collected from multiple sensors or from all sensors, for determining in which presence zone the mobile device 110 is located; performing arbitration when the sensors indicate that the mobile device user is in multiple presence zones; and/or sending location updates to the applications server 172 or to other components of system 100.

Some embodiments utilize presence logging, for example, storing, tracking and/or updating the presence information once it is determined. For example, a presence database 178 is used to log changes in the status of the presence of a mobile device user; the presence database 178 may store, for example, the time of entry into presence zone 152, the time of exit from presence zone 152, the name and type of the presence zone 152, or the like.

In some embodiments, optionally, presence zones may send to the presence server 166 updates regarding the mobile device user's context. This information allows other users and/or devices and/or applications to subscribe to this information and to act based on this information.

In some embodiments, presence zones infrastructure allows creation of various different types of applications, for example, call routing, targeted advertising, gaming, dating, communities, trend analysis of movements of mobile device users, or the like. Applications, services and/or targeted content are provided to a mobile device based on the identity of the mobile device user, the location of the mobile device user, and the context of that location; and optionally based on other properties and information associated with the mobile device user.

Some embodiments utilize one or more sensors (e.g., Bluetooth, Infra Red, RFID, GPS, or the like) running on a suitable platform (e.g., J2ME, Jave 2 Standard Edition (J2SE), or the like, etc) and able to communicate presence of mobile device (s) 110 to a server (e.g., using HTTP, secure HTTP, SIP, secure SIP, or the like). One or more mediators (e.g., presence detectors 165) may map the location of the mobile device 110 to one or more logical zones, and are able to handle various zone types, for example: a small store, a large store, a large auditorium with several entrances and exits, a stadium, a drive-in, a hospital, a hospital department, or the like. The presence server 166 is updated with presence zone 152 information, for example, per mobile device. Presence zone 152 may be defined as one or more logical entities, having owner (s) and preferences. A Web-based interface allows mobile device users and/or presence zone owners to customize or modify their preferences in general, per presence zone, per type of zone, etc. One or more applications of application server 172 subscribe to the presence information in the presence server, and act upon the presence information in accordance with the location of mobile device 110, the preferences of the user of mobile device 110, and the preferences associated with the presence zone 152 and/or the zone owner.

In some embodiments, presence zones data is collected, analyzed, and reported. Reports are produced by a reporting engine 179 with regard to individual mobile device users, groups of users, movement of user(s) among different presence zones, types of presence zones visited, call or message re-routing performed, trends, or the like. In some embodiments, information may be utilized, or shared with third parties, or transferred to or sold to third parties, upon agreement of the mobile device user, and optionally in exchange with decreased cost of services provided.

In some embodiments, for example, a coffee chain collects profile information from consumers or potential consumers, and subscribes to the presence zone service with its profile category definitions and promotion offers by category. Consumers also register for the service indicating participating retailers from which they would like to accept offers. When a participating consumer approaches or enters a coffee shop of the coffee chain, the service accesses the customer profile and sends to the mobile device of the customer a SMS message with the appropriate pre-determined offer.

The coffee shop uses the service to speed up the process for a customer to place and pay for his "usual" order, and/or to offer promotions tailored to the customer. For example, the current promotion is a coupon for one dollar off a breakfast sandwich for customers who never ordered this item. Accordingly, a SMS message is sent to the mobile device showing three options: place the usual order; place the usual order together with a breakfast sandwich including a discount coupon; and a third, different, offer or promotion.

In some embodiments, for example, when the customer approaches his local drive through, he receives a SMS message. The SMS message asks the customer to select from three predetermined options: his usual coffee and donut; his usual coffee with a (discounted) breakfast sandwich; or a third, different, offer. Once the customer selects an option, he receives another SMS message confirming the total price and asking him to accept the charge on his post-paid mobile device bill (e.g., cellular phone bill). The customer then accepts the charge, using his mobile device. When the customer arrives at the drive through window, his order is ready and waiting for him. The cashier is aware that payment has been processed using the customer's mobile device phone bill, and the transaction is rapidly completed without delays.

In some embodiments, for example, a pharmacy chain collects profile information from loyalty card holders and subscribes to the presence zone service with its profile category definitions and promotion offers by category. Consumers also register for the service indicating participating retailers from which they would like to accept offers. When a participating consumer enters the pharmacy, the service accesses the customer profile and sends to his mobile device a SMS message with the appropriate pre-determined offer. The pharmacy defines customer profiles based on monthly spending history and brand preferences. Promotions are designed to encourage clients to purchase store brand products, high margin products or seasonal merchandise.

For example, when customer Jane (carrying her mobile device) enters the pharmacy, the system identifies her and recognizes her as a "gold" customer. Shopping history indicates that Jane typically purchases tissues of the brand "Wonderful"; the system sends to Jane's mobile device a SMS message, offering her a discount coupon if she buys tissues of the brand "Excellent", and further offers her double membership points for her purchase. The SMS message includes an offer code, to be used by Jane if she accepts the promotion. Jane takes her purchase to the cashier and shows the cashier her offer code, which is entered into the point-of-sale to activate the coupon and the bonus membership points to be awarded.

In some embodiments, a service provider collects profile information from its consumers and defines its profile categories and promotion offers by category. The service providers knows when one of its customers approaches (or enters) one of its retail stores. When a consumer approaches (or enters) a store, the system accesses the customer profile, allowing store personnel to know about the consumer who arrived and suggests an offer. The service provider may choose to categorize its customers based on the services they subscribe to. For example, the service provider may be interested in up-selling customers, and/or providing an improved in-store experience.

For example, when Tom approaches or enters the store, he is recognized as a customer, using his mobile device. Accordingly, a specialist in the store approaches Tom when he enters and asks if she may help Tom. She tells Tom that he qualifies for a promotional phone upgrade since he has been with the provider for two years. During the conversation, the store clerk also tells Tom that the store is offering a personalized promotion if Tom agrees to subscribe to a particular additional service. Tom is interested in the service and accepts the personalized promotion, which offers him the first three months free. Tom is further given a promotion code that is valid for three months, should he wish to also subscribe to a second service. Tom's offers are confirmed via SMS messages.

Some embodiments utilize presence zone to define and enforce call routing rules. For example, different call routing rules are applied based on the contextual location of the mobile device user, for example, at home, in the car, on the street, in a theater, at the office, at a meeting, in a stadium, in a restaurant, in a train, in a hospital, in a school, in a high-security facility (e.g., military facility), or the like. For example, presence zone may be used to define or enforce a silence zone, e.g., a zone in which it is mandatory that users do not conduct audio conversations, or a zone in which it is mandatory that mobile devices do not ring; as well as quiet zones, in which compliance is at the discretion of the mobile device user.

In some embodiments, instead of, or in addition to, manual update by the user of his preferred call routing, presence zones may be used to automatically identify the contextual location of the mobile device user, and to automatically update his presence information based on location and predefined user preferences. This includes, for example, automatic identification of the user's physical location, as well as automatic enrichment of location data with contextual information. The zone owner registers with the service provider, and location and context are correlated. Accordingly, instead of identifying only physical coordinates on a map, the system is able to determine that the user is located in the ICU Ward of Mount Sinai Hospital, in the Town Hall, in the lobby of the Lion Theater, or the like; as well as to determine whether or not the presence zone is a quiet zone.

For example, calls and messages may be routed and/or transformed based on location and context, and the user is not required to manually update the profile of his mobile device when changing venue. This may allow, for example, automatic enforcement of a zone's communication etiquette (e.g., mandatory quiet zone, recommended quiet zone, or the like). Call routing and/or transformation may be performed by a call router 164.

In some embodiments, the system may publish location information, as well as location context information, to other users which utilize "Presence Aware" devices. For example, an Instant Messaging (IM) "buddy list" may display a status of "Home", "Office", "Car", "Public Transportation", "Quiet Zone", "Silence Zone", or other status identifiers, instead of or in addition to "Available" or "Offline" status identifiers. In some embodiments, publication of location context information is performed only if the mobile device user pre-authorized such publication to third parties, or only to pre-selected third parties.

In some embodiments, automatic determination of the context of the physical location of the mobile device is used for automatic determination of the preferred type of communication, based on one or more call-routing or call-transformation rules. For example, when the mobile device user is at home, calls may be routed to the home phone (if not busy), or otherwise to the mobile device (namely, cellular phone) or to a pager. When the mobile device user is at the office, calls may be routed to the office phone (if not busy), or otherwise to an Internet chat application or to electronic mail. When the mobile device user is in a car, calls may be routed directly to the voice mail of the cellular phone; optionally, an incoming SMS message is converted (using text-to-voice converter) into voice-mail messages. When the mobile device user is in a quiet zone (e.g., a restaurant or a theater, or potions thereof), calls may be routed directly to the voice mail of the cellular phone; optionally, an incoming SMS message is converted (using text-to-voice converter) into voice-mail messages; optionally, text messages are routed to cellular phone or pager; optionally, urgent messages are converted from voice to text, and optionally a text chat application may be used. When the mobile device user is in a silence zone (e.g., a hospital Intensive Care Unit, or a police station), incoming calls are directly forwarded to voice mail, or to an alternate phone number. When the mobile device user is in a sports arena or stadium, incoming calls are transformed to SMS messages, and optionally a text chat application is invoked. When the mobile device user is not in his home, office or car, incoming calls are routed to the mobile device, namely, the cellular phone (for example, if the user is not in a presence zone associated with various routing rules).

In some embodiments, silence zone rules and quiet zone rules may be enforced using one or more mechanisms. For example, blocking of incoming wireless signals and/or outgoing wireless signals may be used to enforce a silence zone, in which it is mandatory that users do not conduct audio conversations, or in which it is mandatory that mobile devices do not ring (e.g., some hospital wards, a police station, a court of law, an airplane, or the like). In such zones, no calls are sent to the mobile device, in order to enforce silence and/or to avoid RF interference with other equipment (e.g., medical equipment, airplane systems, or the like).

In some embodiments, a forced quiet is enforced if a business selects to completely enforce the quiet zone, only accepting calls for mobile devices that have a profile in effect that has the ringer deactivated or turned off. If the user's quiet zone profile indicates that he would like to ignore the quiet zone, then no calls would be forwarded to the mobile device. Instead, incoming calls are sent directly to voice mail or to an alternative destination.

In some embodiments, a recommended quiet zone is applied, such that the user's quiet zone profile is invoked. A considerate user may define the quite zone profile to prevent his phone from ringing; however, this may be overridden by the mobile device user.

In some embodiments, quiet zone rules and/or silence zone rules are selectively enforced per room, per sub-unit of the zone, per area-of-interest, on specific days (e.g., only on weekdays, only on weekends, only on holidays), at specific times (e.g., at morning time, at night time, between certain hours, at a time in which a doctor enters the patient's room), or based on other conditions or criteria (e.g., quiet zone enforced when the movie plays in the movie theater, and not enforced before the movie starts or after the movie ends).

In some embodiments, application of some rules may be performed without additional cost to the mobile device user, whereas application of other rules may require pre-payment or post-payment. For example, directly routing an incoming call to a voice mail, when the user is in a silence zone, may be performed for free; whereas conversion of an incoming call from speech to text, and/or forwarding the text via SMS or electronic mail, may require payment.

Some embodiments may operate in conjunction with Presence Advanced Services for Telco Applications (PASTA) systems or applications, which allow mobile devices and networks to automatically learn about their users' whereabouts and preferences as they commute, work and travel, using machine-learning and pattern-recognition algorithms.

For example, a first mobile device user ("Anne") registers with presence zones via intranet or the Internet. Anne provides her Bluetooth ID, and fills out the quiet zone profile selecting "forward incoming calls to secretary". Anne leaves her home, and drives to the office in her car. John would like to know where Anne is. A PASTA logic 177 sub-system deducts from GPS updates how far Anne is from her office, and publishes this information; for example, John sees Anne's status (e.g., "car" or "office") using his IM application.

Subsequently, Anne arrives to her office and her presence is updated; she is not in a quiet zone. When John calls Anne, Anne may answer the incoming call. Then, as several customers enter the zone in which Anne is located, a quiet zone is invoked; if John calls Anne, his call is directly forwarded to Anne's secretary. When the customers leave the zone, the quiet zone is cancelled; if John calls Anne, she may answer the incoming call.

In some embodiments, one or more rules may be used to set a zone as a quiet zone. For example, if it is determined that three or more mobile devices are located within a zone, the zone may be automatically set to quiet zone; whereas if it is determined that two or less mobile devices are located within the zone, the quiet zone may be automatically cancelled or suspended.

In some embodiments, communication between a presence zone sub-system and a PASTA sub-system is performed, for example, using a proxy and a presence server. The presence server is able to publish and update presence information, and the proxy—or an application server—is able to subscribe to presence information. Optionally, the presence server is associated with the PASTA logic 177 sub-system, in which a pattern recognition engine and a pattern learning engine generate rich presence information, which may be injected or otherwise transferred to the presence server for further publishing.

In some embodiments, a presence zones application may include a dating or matching application. For example, the application identifies mobile device users that are located in a particular zone, or a particular type of zone; and provides a matching service based on preferences defined by the users. For example, the users may see on their mobile devices the list of people located nearby who would like to meet other people and who meet their preference criteria.

In some embodiments, a presence zones application may include a gaming application which identifies mobile device users that are located in a particular zone, or a particular type of zone; and publishes those that are available for gaming or playing a particular game and who meet the user's pre-defined preferences (e.g., skill level, age, gender, or other parameters).

Figure 2:
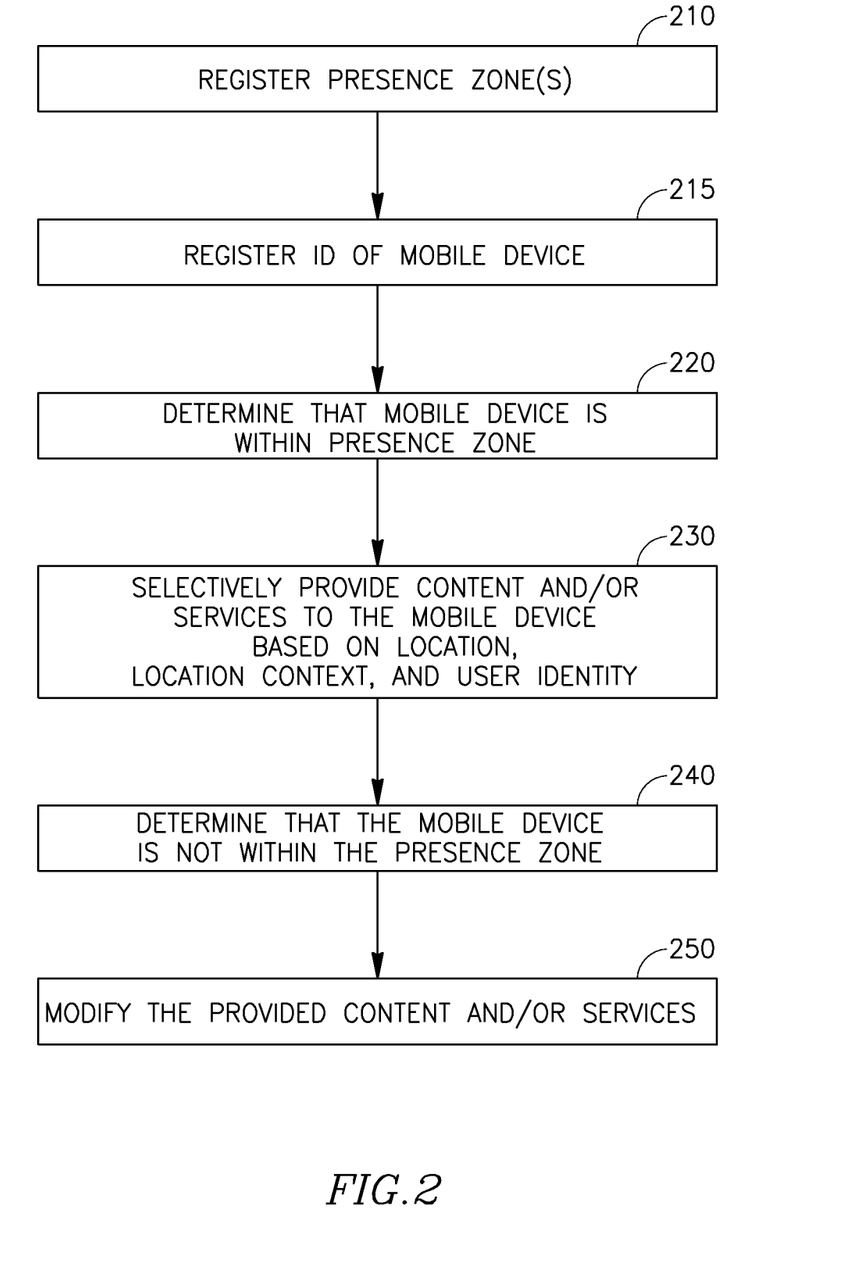
FIG. 2 is a schematic flow-chart of a method of wireless communication in accordance with a demonstrative embodiment of the invention.

FIG. 2 is schematic flow-chart of a method of wireless communication in accordance with some demonstrative embodiments of the invention. Operations of the method may be used, for example, by system 100 of FIG. 1, and/or by other suitable units, devices and/or systems.

In some embodiments, the method may include, for example, registering a presence zone corresponding to a geo-spatial location (block 210). In some embodiments, instead of or in addition to zone registration, other zone initialization operations may be performed, for example, inferring a presence zone (e.g., based on PASTA logic or information).

In some embodiments, the method may include, for example, registering an ID of a mobile device (block 215).

In some embodiments, the method may include, for example, determining that the mobile device is located within the presence zone (block 220).

In some embodiments, the method may include, for example, selectively providing content and/or services to the mobile device through wireless communication, based on the location of the mobile device, the context of the location, and the identity of the user of the mobile device (block 230).

In some embodiments, the method may subsequently include, for example, determining that the mobile device is no longer located within the presence zone (block 240). This may include, for example, exit from the presence zone, or moving from a first present zone to a second present zone.

In some embodiments, the method may subsequently include, for example, modifying content and/or services provided to the mobile device through wireless communication based on the determination of block 240. This may include, for example, modifying call routing rules that apply to incoming communications, based on exit from a presence zone, entry into a presence zone, or movement from a first presence zone to a second presence zone.

Other suitable operations or sets of operations may be used in accordance with embodiments of the invention.

Some embodiments of the invention, for example, may take the form of an entirely hardware embodiment, an entirely software embodiment, or an embodiment including both hardware and software elements. Some embodiments may be implemented in software, which includes but is not limited to firmware, resident software, microcode, or the like.

Furthermore, some embodiments of the invention may take the form of a computer program product accessible from a computer-usable or computer-readable medium providing program code for use by or in connection with a computer or any instruction execution system. For example, a computer-usable or computer-readable medium may be or may include any apparatus that can contain, store, communicate, propagate, or transport the program for use by or in connection with the instruction execution system, apparatus, or device.

In some embodiments, the medium may be an electronic, magnetic, optical, electromagnetic, infrared, or semiconductor system (or apparatus or device) or a propagation medium. Some demonstrative examples of a computer-readable medium may include a semiconductor or solid state memory, magnetic tape, a removable computer diskette, a random access memory (RAM), a read-only memory (ROM), a rigid magnetic disk, and an optical disk. Some demonstrative examples of optical disks include compact disk-read only memory (CD-ROM), compact disk-read/write (CD-R/W), and DVD.

In some embodiments, a data processing system suitable for storing and/or executing program code may include at least one processor coupled directly or indirectly to memory elements, for example, through a system bus. The memory elements may include, for example, local memory employed during actual execution of the program code, bulk storage, and cache memories which may provide temporary storage of at least some program code in order to reduce the number of times code must be retrieved from bulk storage during execution.

In some embodiments, input/output or I/O devices (including but not limited to keyboards, displays, pointing devices, etc.) may be coupled to the system either directly or through intervening I/O controllers. In some embodiments, network adapters may be coupled to the system to enable the data processing system to become coupled to other data processing systems or remote printers or storage devices, for example, through intervening private or public networks. In some embodiments, modems, cable modems and Ethernet cards are demonstrative examples of types of network adapters. Other suitable components may be used.

Functions, operations, components and/or features described herein with reference to one or more embodiments, may be combined with, or may be utilized in combination with, one or more other functions, operations, components and/or features described herein with reference to one or more other embodiments, or vice versa.

While certain features of some embodiments of the invention have been illustrated and described herein, many modifications, substitutions, changes, and equivalents may occur to those skilled in the art. It is, therefore, to be understood that the appended claims are intended to cover all such modifications and changes.

What is claimed is:

1. A method for physical context based wireless communication, the method comprising:
    determining a spatial location of a wireless communication device;
    establishing location context information of a user of the wireless communication device relating to the spatial location, the location context information comprising a context of the spatial location and properties of the user of the wireless communication device, the properties comprising an identity, an age and a gender of the user;
    determining a first association between the spatial location of the wireless communication device and the location context information;
    dynamically modifying the context of the spatial location according to situational information, comprising at least one of a presence of other users and a time parameter;
    correlating the location context information of the user with the dynamically modified context of the spatial location to define new location context information; and
    communicating content to the wireless communication device, the content being varied responsively to the new location context information.

2. The method of claim 1, wherein determining the first association between the spatial location and the location context information comprises:
    measuring a presence zone perimeter associated with the spatial location; and
    registering the first association between the spatial location and the location context information based on the presence zone perimeter.

3. The method of claim 1, wherein determining the first association between the spatial location and the location context information comprises:
    dynamically inferring the first association between the spatial location and the location context information based on Presence Advanced Services for Telco Applications logic.

4. The method of claim 1, comprising:
    determining whether or not said wireless communication device is located in said spatial location by one or more operations selected from the group consisting of:
    determining based on cellular triangulation of the wireless communication device;
    determining based on Global Positioning System trilateration of the wireless communication device;
    determining based on sensing a Radio Frequency ID element of the wireless communication device;
    determining based on sensing a Bluetooth wireless signal transmitted by the wireless communication device;
    determining based on sensing an IEEE 802.11 wireless signal transmitted by the wireless communication device; and
    determining based on sensing an IEEE 802.16 wireless signal transmitted by the wireless communication device.

5. The method of claim 1, wherein determining the identity of the user of the wireless communication device comprises determining a customer status of the user and further comprises one or more operations selected from the group consisting of:
    one or more operations for determining the identity of the user based on ID data associated with the wireless communication device and based on a first database of cellular phone users; and
    one or more operations for determining the identity based on ID data associated with the wireless communication device and a second database having pre-registered information entered by the user of the wireless communication device, wherein communicating content comprises varying the content responsively to the customer status of the user.

6. The method of claim 1, comprising:
    determining whether or not a first wireless communication device is located in the spatial location;
    determining an identity of a user of the first wireless communication device;
    determining whether or not a second wireless communication device is located in the spatial location;
    determining an identity of a user of the second wireless communication device; and
    associating between the location context information, the user of the first wireless communication device, and the user of the second wireless communication device.

7. The method of claim 1, comprising:
    registering a presence zone associated with the spatial location;
    automatically determining whether or not the wireless communication device is within the presence zone; and publishing to a presence server an indication selected from the group consisting of:
an indication that the wireless communication device is within the presence zone; and
an indication that the wireless communication device is not within the presence zone.

8. The method of claim 7, comprising:
determining whether or not the wireless communication device has moved from a first presence zone associated with a first spatial location to a second presence zone associated with a second spatial location; and
activating one or more pre-defined call routing rules associated with the second presence zone.

9. The method of claim 1, comprising:
selectively providing a content item to the wireless communication device based on the identity of the user of the wireless communication device, the spatial location of the wireless communication device, and the location context information related to the wireless communication device, wherein the content item is selected from the group consisting of: an advertisement, a coupon, a promotional offer, a dating application, a dating content item, a gaming application, and a gaming content item.

10. The method of claim 1, comprising:
routing an incoming call addressed to the wireless communication device to an alternate destination, based on the identity of the user of the wireless communication device, the spatial location of the wireless communication device, and the location context information related to the wireless communication device.

11. The method of claim 10, wherein the alternate destination comprises one or more of: a voice messaging system, an electronic mail system, an Instant Messaging system, a Short Messaging Service system, an alternate telephone number, and a pager.

12. A system for physical context based wireless communication, the system comprising:
a server operative to determine a spatial location of a wireless communication device, establish location context information of a user of the wireless communication device relating to the spatial location, the location context information comprising a context of the spatial location and properties of the user of the wireless communication device, the properties comprising an identity of the user, to determine a first association between the spatial location of the wireless communication device and the location context information, and to dynamically modify the context of the spatial location according to situational information, comprising at least one of a presence of other users and a time parameter, to correlate the location context information of the user with the dynamically modified context of the spatial location to define new location context information, and to communicate content to the wireless communication device, the content being varied responsively to the new location context information.

13. The system of claim 12, further comprising:
a portable device to measure a presence zone perimeter associated with the spatial location, and to register the first association between the spatial location and the location context information based on the presence zone perimeter.

14. The system of claim 12, further comprising:
a logic unit to dynamically infer the first association between the spatial location and the location context information based on Presence Advanced Services for Telco Applications logic.

15. The system of claim 12, further comprising:
a presence detector to determine whether or not that said wireless communication device is located in said spatial location by one or more algorithms selected from the group consisting of:
an algorithm based on cellular triangulation of the wireless communication device;
an algorithm based on Global Positioning System trilateration of the wireless communication device;
an algorithm based on sensing a Radio Frequency ID element of the wireless communication device;
an algorithm based on sensing a Bluetooth wireless signal transmitted by the wireless communication device;
an algorithm based on sensing an IEEE 802.11 wireless signal transmitted by the wireless communication device; and
an algorithm based on sensing an IEEE 802.16 wireless signal transmitted by the wireless communication device.

16. The system of claim 12, wherein the server is operative to determine a customer status of the user and further comprises one or more operations selected from the group consisting of:
one or more operations for determining the identity of the user based on ID data associated with the wireless communication device and based on a first database of cellular phone users; and
one or more operations for determining the identity of the user of the wireless communication device based on ID data associated with the wireless communication device and a second database having pre-registered information entered by the user of the wireless communication device, wherein communicating content comprises varying the content responsively to the customer status of the user.

17. The system of claim 12, further comprising:
a presence detector to determine whether or not a first wireless communication device is located in the spatial location, to determine an identity of a user of the first wireless communication device, to determine whether or not a second wireless communication device is located in the spatial location, and to determine an identity of a user of the second wireless communication device, wherein the server is operative to associate between the location context information, the user of the first wireless communication device, and the user of the second wireless communication device.

18. The system of claim 12, wherein the server is operative to register a presence zone associated with the spatial location, to automatically determine whether or not the wireless communication device is within the presence zone, and to publish to one or more subscribers an indication selected from the group consisting of:
an indication that the wireless communication device is within the presence zone; and
an indication that the wireless communication device is not within the presence zone.

19. A wireless communication device adapted for physical context based wireless communication, the wireless communication device comprising:
a wireless receiver to receive a wireless communication signal carrying a content item selected by a remote transmitter based on a first determined association between a spatial location of a user of the wireless communication device and location context information related to said spatial location, the location context information comprising a context of the spatial location, and properties of the user of the wireless communication device, the properties comprising a determined identity of the user of the wireless communication device; and a processor to perform at least part of a logic which determines the first association between the spatial location and the location context information, determines the identity of the user, dynamically modify the context of the spatial location according to situational information, comprising at least one of a presence of other users and a time parameter, to correlate the location context information of the user with the dynamically modified context of the spatial location to define new location context information, the content item being varied responsively to the new location context information.

20. The wireless communication device of claim 19, comprising:

a communication unit selected from the group consisting of: a Global Positioning System receiver, a Radio Frequency ID element, a Bluetooth transceiver, an IEEE 802.11 transceiver, an IEEE 802.16 transceiver.

21. The wireless communication device of claim 20, further comprising:

an interface operative to register ID data from a remote database associated with the remote transmitter.

* * * * *